US011861970B2

(12) United States Patent
Adamek et al.

(10) Patent No.: US 11,861,970 B2
(45) **Date of Patent: *Jan. 2, 2024**

(54) SYMBOL SUBSTITUTION SYSTEM

(71) Applicant: IGT, Las Vegas, NV (US)

(72) Inventors: Stephan Adamek, Graz (AT); Alois Mazgan, Raaba (AT); Michael Russ, Graz (AT)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,474

(22) Filed: Dec. 9, 2022

(65) Prior Publication Data

US 2023/0109791 A1 Apr. 13, 2023

Related U.S. Application Data

(63) Continuation of application No. 17/172,464, filed on Feb. 10, 2021, now Pat. No. 11,562,615.

(60) Provisional application No. 63/008,395, filed on Apr. 10, 2020.

(51) Int. Cl.
*G07F 17/32* (2006.01)

(52) U.S. Cl.
CPC ...... *G07F 17/3209* (2013.01); *G07F 17/3223* (2013.01); *G07F 17/3255* (2013.01); *G07F 17/3262* (2013.01); *G07F 17/3225* (2013.01); *G07F 17/3232* (2013.01)

(58) Field of Classification Search
CPC ............ G07F 17/3209; G07F 17/3223; G07F 17/3255; G07F 17/3262; G07F 17/3225; G07F 17/3232
See application file for complete search history.

(56) References Cited

U.S. PATENT DOCUMENTS

| | | | |
|---|---|---|---|
| 8,147,334 B2 | 4/2012 | Gatto et al. | |
| 8,764,566 B2 | 7/2014 | Miltenberger et al. | |
| 11,562,615 B2 | 1/2023 | Adamek et al. | |
| 2002/0151349 A1 | 10/2002 | Joshi | |
| 2003/0064805 A1 | 4/2003 | Wells | |
| 2008/0305856 A1* | 12/2008 | Walker .................... | G07F 17/32 463/20 |
| 2009/0088239 A1 | 4/2009 | Iddings et al. | |
| 2011/0223990 A1 | 9/2011 | Burke et al. | |
| 2014/0228101 A1 | 8/2014 | Baerlocher | |

(Continued)

OTHER PUBLICATIONS

Official Action for U.S. Appl. No. 17/172,464, dated Mar. 23, 2022 25 pages.

(Continued)

*Primary Examiner* — Werner G Garner
(74) *Attorney, Agent, or Firm* — Sheridan Ross P.C.

(57) ABSTRACT

The present disclosure relates generally to a system and method for substituting images, graphics, video, and other content presented by an Electronic Gaming Machine (EGM during execution of an electronic game. Embodiments can include a mobile application which can be used in the casino environment, for example, and through which players of electronic games may choose different game content either out of a pre-defined set of content that can be updated and/or supplemented over time or by uploading their own such as photographs, icons, graphics, etc.

14 Claims, 5 Drawing Sheets

(56) References Cited

U.S. PATENT DOCUMENTS

| | | | | |
|---|---|---|---|---|
| 2014/0364203 | A1 | 12/2014 | Nelson et al. | |
| 2015/0087369 | A1* | 3/2015 | McIntyre | G07F 17/3218<br>463/31 |

OTHER PUBLICATIONS

Notice of Allowance for U.S. Appl. No. 17/172,464, dated Sep. 27, 2022 11 pages.
Official Action for U.S. Appl. No. 18/080,901, dated May 10, 2023 17 pages.
Notice of Allowance for U.S. Appl. No. 18/080,901, dated Aug. 25, 2023 8 pages.

* cited by examiner

SYMBOL SUBSTITUTION SYSTEM

CROSS REFERENCE TO RELATED APPLICATION

The present application claims priority to, and is a continuation of, U.S. Non-Provisional application Ser. No. 17/172,464, filed Feb. 10, 2021, which claims priority to, U.S. Provisional Application No. 63/008,395, filed Apr. 10, 2020, the entire disclosure of which is hereby incorporated by reference.

BACKGROUND

Electronic Gaming Machines (EGMs) execute a variety of different electronic games such as slots, video poker, video roulette, etc. During execution of these games, various icon, images, graphics, animations videos, sounds, and other content are generated and presented by the EGM. This content is preconfigured for the electronic game and is largely static or non-configurable, especially by a player of the game. As a result, certain games may become stale to the player over time and the player may lose interest in the game.

BRIEF SUMMARY

In certain embodiments, the present disclosure relates to a mobile device including a processor and a memory coupled with and readable by the processor and storing therein a set of instructions which, when executed by the processor, causes the processor to connect with an Electronic Gaming Machine (EGM) executing an electronic game and which can present content during execution of the electronic game. An indication that the content presented by the EGM during execution of the electronic game is available to be replaced with substitute content can be presented to a user of the mobile device. A request to replace the content presented by the EGM during execution of the electronic game with the substitute content can be received from the user of the mobile device. A determination can be made as to whether the requested replacement of the content of the electronic game with the substitute content is permissible based on a status of the user of the mobile device. In response to determining the requested replacement of the content of the electronic game is permissible, an electronic message requesting replacement of the content of the electronic game with the substitute content can be sent to the EGM.

Additional features and advantages are described herein and will be apparent from the following Description and the figures.

DETAILED DESCRIPTION

Embodiments of the present disclosure will be described in connection with a system and method for substituting images, graphics, video, and other content presented by an Electronic Gaming Machine (EGM) during execution of an electronic game. Embodiments can include a mobile application which can be used in the casino environment, for example, and through which players of electronic games may choose different game content either out of a predefined set of content that can be updated and/or supplemented over time or by uploading their own such as photographs, icons, graphics, etc.

The ability to use the substitute content may be associated with a casino or gaming venue loyalty program or a paid subscription service. In some cases, free usage might be provided and allow some basic functionality, e.g., to substitute a low value symbol out of a limited scope of the full content database. Players with an active loyalty membership or subscription, which may be paid regularly or one time, might be allowed to change more and different content in the game, out of a bigger set of available content. Additionally, or alternatively, seasonal fees might allow and/or include seasonal themed content offered within in the actual season, e.g., a holiday, a sports theme during a particular sport season, etc.

Substitute content selections may be stored to records associated with the player's subscription or loyalty account or within the application and used when the player starts a game. After cashing out, game content can be reset to default for next players. If the player has an active loyalty account, the subscription fee might also be linked to a tier level or paid from the loyalty account. In this way, players can have an impact on the game's appearance creating a personalized game play experience.

Figure 1:
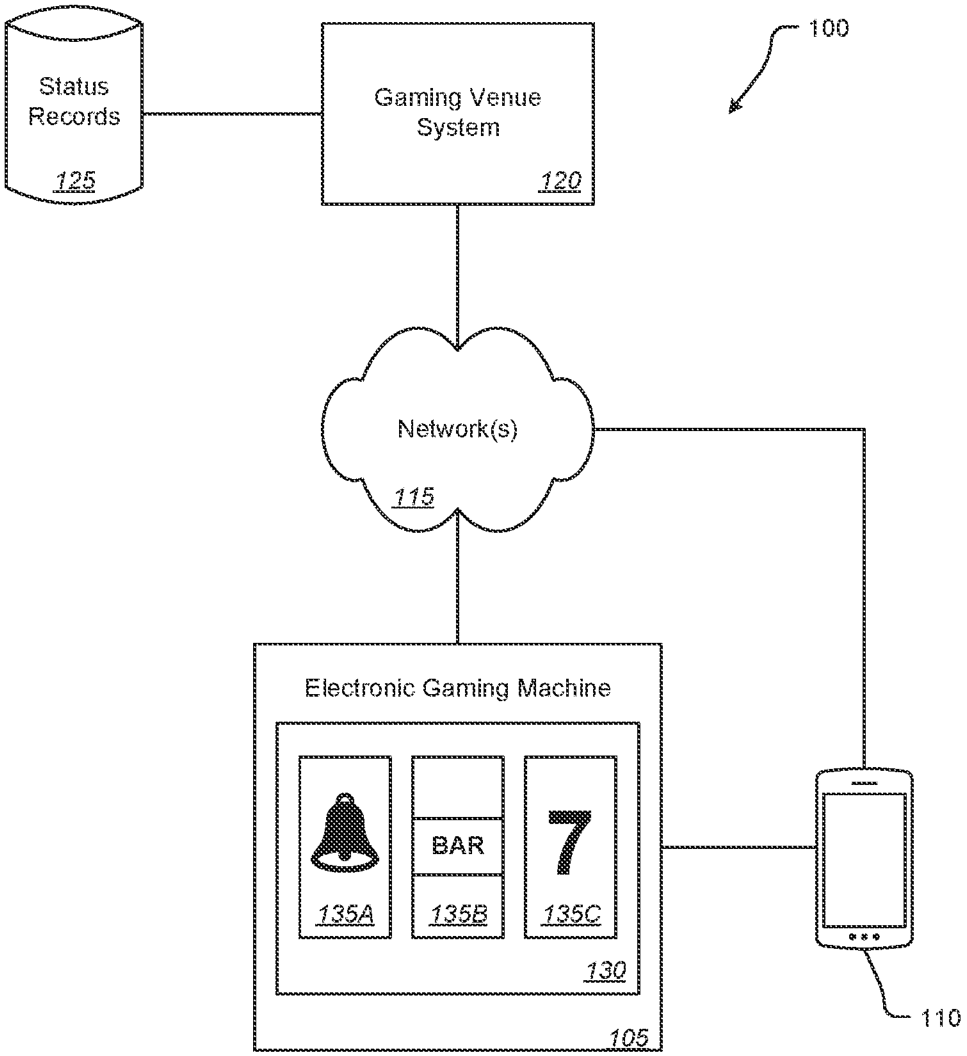
FIG. 1 is a block diagram illustrating an environment in which game content substitution can be performed according to one embodiment of the present disclosure.

FIG. 1 is a block diagram illustrating an environment in which game content substitution can be performed according to one embodiment of the present disclosure. As illustrated in this example, the environment 100, such as may be found in a casino or other gaming venue, can comprise an Electronic Gaming Machine (EGM) 105. The EGM 105 can be coupled with one or more wired and/or wireless communications networks 115 within the gaming venue. Through the communications networks 115, the EGM 105 may communication with a gaming venue system 120 comprising one or more servers and/or other computing devices. The environment 100 can also include a mobile device 110. The mobile device 110 can wirelessly connect and communicate with the EGM 110 through the network 115 or directly, for example, when a user of the mobile device 110 enters the casino or gaming venue, approaches the EGM 105, begins playing a game on the EGM 105, etc.

Generally speaking, the EGM 105 can execute an electronic game which presents content 135A-135C such as images, graphics, animations, video, etc. on a display 130. According to one embodiment, and as will be described in greater detail, the mobile device 110 can execute an application which allows the user of the mobile device 110 to change or substitute 135A-135C the content presented. As noted, the ability to make this substitution may be based on a status of the user of the mobile device 110 as indicated in a set of status records 125 maintained by the gaming venue system 120. The status records 125 can relate to and/or indicate a loyalty program status, a subscription status, or other status of the user of the mobile device 110 which allows or enables that user to select and utilize different images, graphics, videos, and/or other content on the EGM 105.

It should be noted and understood that embodiments described herein can be used with a wide variety of different electronic games including but not limited to a video slot game, a stepper slot game with a separate screen for each mechanical reel, a video poker game, a video keno game, a virtual sports bet game, etc. Content which can be substituted can include but is not limited to game symbols, parts of a game symbol, e.g. replacing a face, symbol frames, symbol win animations, symbol sounds, symbol win sounds, game background, game sound, game button icons, symbol add-ons, etc. According to one embodiment, the substitute content can comprise side information outside the reel area/game play area such as news/headlines, stock exchange rate, sporting event scores or updates, etc.

As noted above, the mobile device 110 can connect with the EGM 105 via a wireless communications channel such as Bluetooth, WiFi, etc. Additionally, or alternatively, the mobile device 110 can connect with the gaming venue system 120 via a wireless communications channel such as WiFi, for example, when the user of the mobile device 110 enters the casino or gaming venue. Notifications can be provided to the mobile device 110, by either or both of the gaming venue system 120 and/or EGM 105 to inform the user of the mobile device 110 that substitute content is available for a particular game. In some cases, such notifications may be provided by the EGM 105 when the user connects the mobile device 110 with the EGM, e.g. via NFC, Bluetooth, WiFi, etc. or scans a QR code presented by the EGM 105. According to one embodiment, the notification may provide a list of options for the substitute content and/or a preview of the substitute content. In some cases, such a preview may be provided, for example, through a website of the gaming venue which the user of the mobile device can access offsite through the mobile device 110 or other computing system (not shown here). Through such a preview, the user may select and/or configure substitute content for one or more EGMs to be used at the designated EGM and gaming venue when the user enters the venue and connects the mobile device 110 to the network 115 and/or EGM 105.

Figure 2:
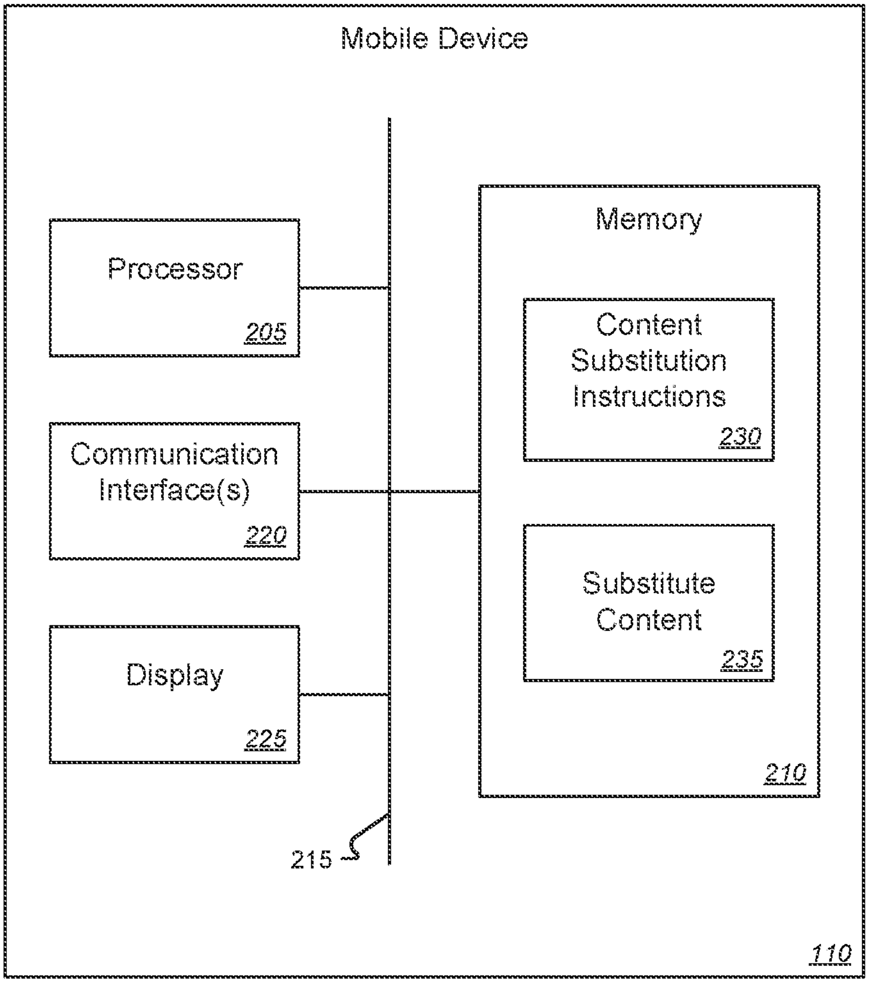
FIG. 2 is a block diagram illustrating additional details of an exemplary mobile device for performing game content substitution according to one embodiment of the present disclosure.

FIG. 2 is a block diagram illustrating additional details of an exemplary mobile device for performing game content substitution according to one embodiment of the present disclosure. As illustrated in this example, a mobile device 110 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the mobile device 110 as described herein.

A memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communication interfaces 220 and a display 225 via the communications bus 215. The communication interfaces 220 can comprise, for example, cellular, Bluetooth, WiFi, or other type of wireless communications interfaces. The display 225 can comprise, for example, a Liquid Crystal Display (LCD), Light Emitting Diode (LED), Organic Light Emitting Diode (OLED), or other type of display.

The memory 210 can store therein sets of instructions which, when executed by the processor 205, cause the processor 205 to perform substitution of content of an electronic game as described herein. More specifically, the memory 210 can store a set of content substitution instructions 230 which can, when executed by the processor 205, cause the processor 205 to optionally update an electronic record defining a status of a user of the mobile device 110. The record may be maintained in a repository of user information by another system such as the gaming venue system 120 described above. The record may be updated, for example, by the content substitution instructions 230 causing the processor 205 to initiate an enrollment in a loyalty program for a gaming venue, request a subscription to a service provided by a gaming venue, etc.

The content substitution instructions 230 can further cause the processor 205 to detect an EGM 105, e.g., when a play approaches within range of Bluetooth, NFC, or other short-range communication interfaces 220*s* or uses the mobile device 110 to scan or enter a code from the EGM 105. The content substitution instructions 230 can then cause the processor 205 to connect with the EGM 105, e.g., via Bluetooth, WiFi, or other wireless communication interfaces 220.

As noted above, the EGM 105 can present content during execution of an electronic game. In some cases, this content can be replaced or substituted with other content to change the theme, style or aesthetics of the game. For example, the content can be replaced with content having a seasonal theme or a local sports team theme. In other cases, the content can be replaced with content of the user's choice or even content provided by the user. In any such case, the content substitution instructions 230 can cause the processor 205 to receive a notification from the EGM 105, the notification indicating that the content presented by the EGM 105 during execution of the electronic game is available to be replaced with the substitute content.

The content substitution instructions 230 can then cause the processor 205 to present an indication of this available substitution content to the user of the mobile device 110, e.g., through the display 225 and receive a response, e.g., a request to replace the content presented by the EGM 105 during execution of the electronic game with the substitute content, from the user of the mobile device 110. For example, the substitute content can comprise a plurality of options for content presented by the EGM 105 during execution of the electronic game and the indication of the available substitute content received from the EGM 105 and presented to the user of the mobile device 110 can comprise an indication of each option. In such cases, the indication of acceptance of the substitute content can comprise a selection of one of the options. In another example, the substitute content can comprise substitute content, which can also be stored in the memory 210, and provided by the user of the mobile device 110. In such cases, the response can comprise a selection or indication of the content.

The content substitution instructions 230 can, in some cases, cause the processor 205 to determine whether the requested replacement of the content of the electronic game with the substitute content is permissible based on a status of the user of the mobile device 110. For example, the determination can be made based on whether the user of the mobile device 110 is a subscriber to a service or a member of a loyalty program of a gaming venue in which the EGM 105 is located. In response to determining the requested replacement of the content of the electronic game is permissible, the content substitution instructions 230 can cause the processor 205 to send an electronic message to the EGM 105 requesting replacement of the content of the electronic game with the substitute content.

According to one embodiment, in response to determining the requested replacement of the content of the electronic game is not permissible, the content substitution instructions 230 can cause the processor 205 to present a prompt providing an offer to change the status to the user of the mobile device of the user of the mobile device 110, e.g., through a user interface presented on the display 225. The content substitution instructions 230 can further cause the processor 205 to receive a response to the offer and determine whether the response indicates acceptance or rejection of the offer to change the status. In response to determining the response indicates rejection, processing can end. In response to determining the response indicates acceptance, the content substitution instructions 230 can cause the processor 205 to update an electronic record indicating the status of the user and send an electronic message to the EGM 105 requesting replacement of the content of the electronic game with the substitute content.

As noted above, the status of the user of the mobile device 110 can be based on membership in a loyalty program of a gaming venue in which the EGM is located. In such cases, the prompt providing the offer to change the status can comprise an offer to enroll in the loyalty program and the content substitution instructions 230 can cause the processor 205 to update the electronic record indicating the status by initiating an process of enrollment of the user of the mobile device in the loyalty program. In other cases, the status of the user of the mobile device can be based on a subscription to a game play service. In such cases, the prompt providing the offer to change the status of the user can comprise an offer to subscribe to the game play service and the content substitution instructions 230 can cause the processor 205 to update the electronic record indicating the status by initiating a process of subscription of the user in the game play service.

Figure 3:
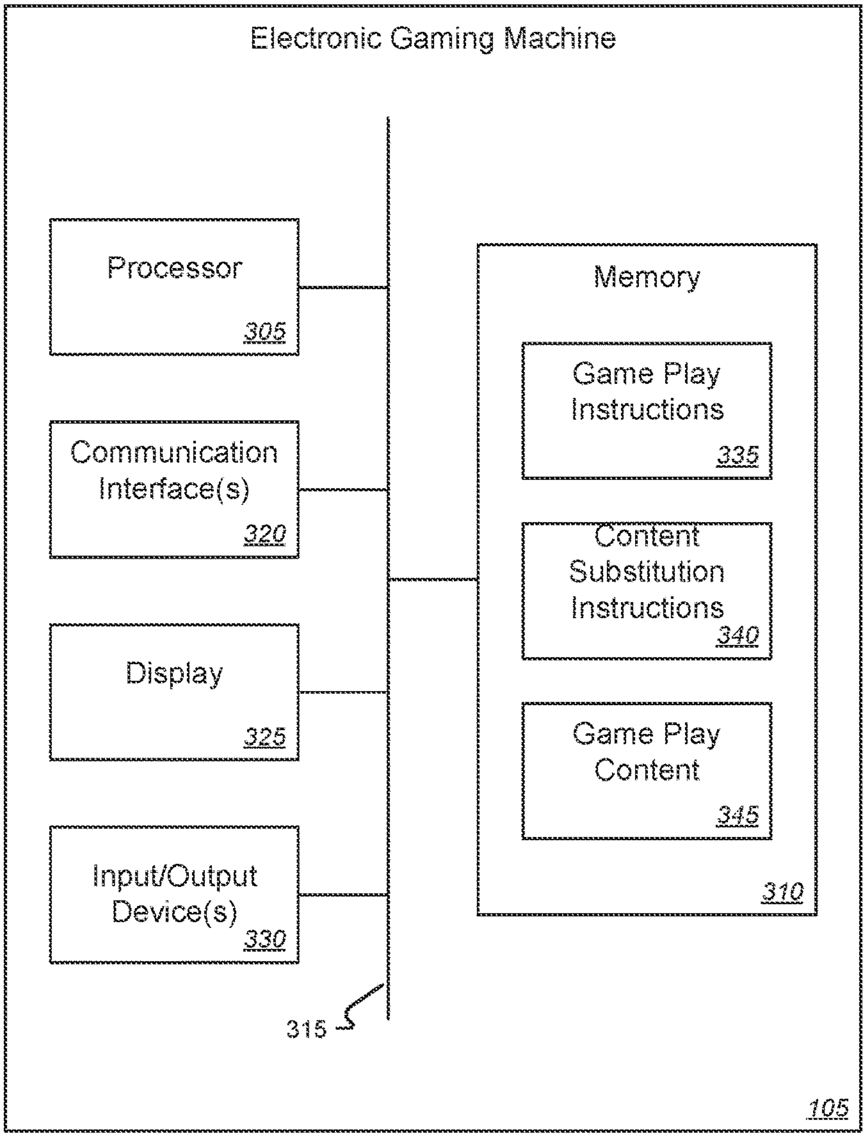
FIG. 3 is a block diagram illustrating additional details of an exemplary Electronic Gaming Machine (EGM) for performing game content substitution according to one embodiment of the present disclosure.

FIG. 3 is a block diagram illustrating additional details of an exemplary EGM for performing game content substitution according to one embodiment of the present disclosure. As illustrated in this example, an EGM 105 can comprise a processor 305 such as any of the processors described above. The processor 305 can be coupled with a memory 310 such as any of the volatile or non-volatile memories also described above via a communications bus 315 as also described. The processor 305 can also be connected with one or more communications interfaces 320 such as any wired and/or wireless communications interfaces, a display 325 such as a Liquid Crystal Display (LCD), Light Emitting Diode (LED), Organic Light Emitting Diode (OLED), or other type of display, and one or more input/output devices 430 such as buttons, switches, levers, dials, touch panels, etc. through which a player can interact with the EGM 105.

The memory 410 can store therein instruction including a set of game play instructions 335 which, when executed by the processor 305, can cause the processor 305 to execute the electronic game. Execution of the electronic game can comprise presenting game play content 345, i.e., various images, graphics, videos, etc. The game play content 345, which can also be stored in the memory 310 can comprise default content as well as substitution content available for replacement of the default content as described herein. The default content and the substitute content can comprise one or more elements of a user interface of the electronic game. In some cases, the default content and the substitute content can comprise a plurality of elements of a user interface of the electronic game and can define a theme for the electronic game. For example, the substitute content can define a seasonal theme, such as a holiday theme, a theme related to a local sports team, a theme related to a gaming tournament or another event, etc.

The memory 310 can also have stored therein a set of content substitution instructions 340 which, when executed by the processor 305, cause the processor 305 to connect, e.g., via Bluetooth, WiFi, or other wireless communication interfaces 320*s*, with a mobile device 110 of a player of the electronic game. The content substitution instructions 340 can further cause the processor 305 to receive user information for the player of the electronic game, e.g., from a mobile device 110 of the player, from a repository of player information maintained by a gaming venue system 120, etc. The user information can indicate a status of the player of the electronic game. For example, the status of the player of the electronic game can be based on membership in a loyalty program of a gaming venue in which the EGM 105 is located. In other cases, the status of the player of the electronic game can be based on a subscription to a game play service.

The content substitution instructions 340 can further cause the processor 305 to make a determination as to whether the substitute content is available to the player of the electronic game based on the status of the player of the electronic game. In response to determining the substitute content is not available, e.g., the player is not a loyalty program member, subscriber, etc., processing can end. In response to determining the substitute content is available, the content substitution instructions 340 can further cause the processor 305 to send an electronic message indicating the substitute content to the mobile device 110 via a wireless communications interface 320.

The content substitution instructions 340 can further cause the processor 305 to receive a response to the message indicating the substitute content, e.g., from the mobile device 110 through the communications interfaces 320. In some cases, the substitute content can comprise content defined by the player of the electronic game and the response can comprise an indication of the substitute content, e.g., a link to the content or the content itself. The content substitution instructions 340 can further cause the processor 305 to make a determination as to whether the response indicate acceptance of the substitute content. In response to determining the response does not indicate acceptance, processing can end. In response to determining the electronic message indicating acceptance of the substitute content, the content substitution instructions 340 can further cause the processor 305 to replace the default content of the game with the substitute content during execution of the electronic game.

Figure 4:
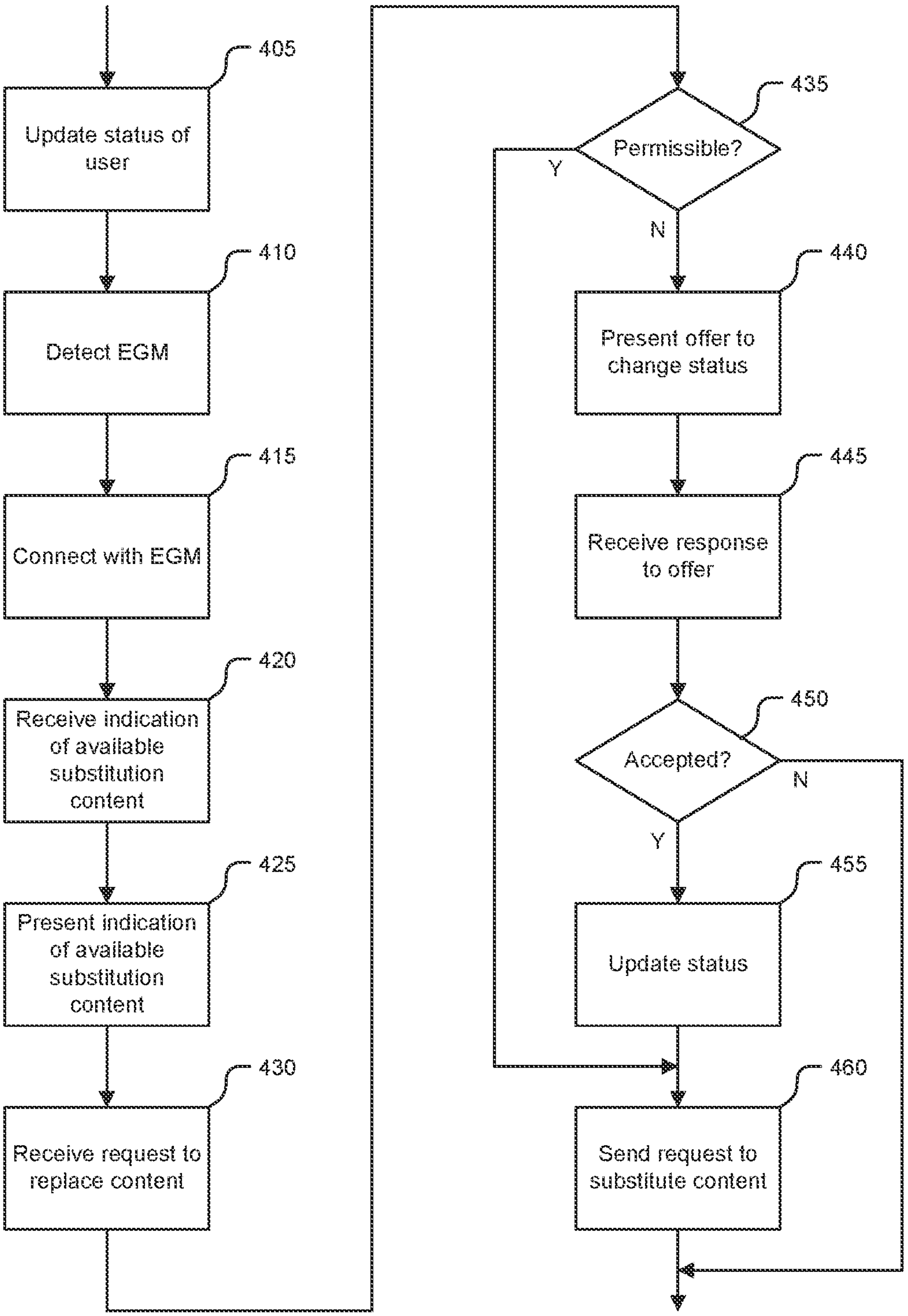
FIG. 4 is a flowchart illustrating an exemplary process for performing game content substitution according to one embodiment of the present disclosure.

FIG. 4 is a flowchart illustrating an exemplary process for performing game content substitution according to one embodiment of the present disclosure. More specifically, this example illustrates a process for performing content substitution as may be performed by a mobile device 110 as described above. Optionally, and as illustrated here, performing content substitution can begin with updating 405 an electronic record defining a status of a user of the mobile device 110. The record may be updated 405, for example, by initiating an enrollment in a loyalty program for a gaming venue, by requesting or accepting a subscription to a service provided by a gaming venue, etc.

An EGM 105 can be detected 410 by the mobile device 110, e.g., when a play approaches within range of Bluetooth, NFC, or other short-range communications or uses the mobile device 110 to scan or enter a code from the EGM 105. The mobile device 110 can then connect 415 with the EGM 105, e.g., via Bluetooth, WiFi, or other wireless communications.

As noted above, the EGM 105 can present content during execution of an electronic game. In some cases, this content can be replaced or substituted with other content to change the theme, style or aesthetics of the game. For example, the content can be replaced with content having a seasonal theme or a local sports team theme. In other cases, the content can be replaced with content of the user's choice or even content provided by the user. In any such case, a notification can be received 420 from the EGM 105 indicating that the content presented by the EGM 105 during execution of the electronic game is available to be replaced with the substitute content.

An indication of this available substitution content can then be presented 425 to the user of the mobile device 110, e.g., through the display 225 of the mobile device 110 and a response, e.g., a request to replace the content presented by the EGM 105 during execution of the electronic game with the substitute content, can be received 430, from the user of the mobile device 110. For example, the substitute content can comprise a plurality of options for content presented by the EGM 105 during execution of the electronic game and the indication of the available substitute content received from the EGM 105 and presented to the user of the mobile device 110 can comprise an indication of each option. In such cases, the indication of acceptance of the substitute content can comprise a selection of one of the options. In another example, the substitute content can comprise content provided by the user of the mobile device 110. In such cases, the response can comprise a selection or indication of the content, e.g., available in the memory of the mobile device 110, in cloud storage, from social media of the user of the mobile device 110, etc.

A determination 435 can be made as to whether the requested replacement of the content of the electronic game with the substitute content is permissible based on a status of the user of the mobile device 110. For example, the determination 435 can be made based on whether the user of the mobile device 110 is a subscriber to a service or a member of a loyalty program of a gaming venue in which the EGM 105 is located. In response to determining 435 the requested replacement of the content of the electronic game is permissible, an electronic message can be sent 460 to the EGM requesting replacement of the content of the electronic game with the substitute content.

According to one embodiment, in response to determining 435 the requested replacement of the content of the electronic game is not permissible, a prompt providing an offer to change the status can be presented 440 to the user of the mobile device of the user of the mobile device 110, e.g., through a user interface of the mobile device 110. A response to the offer to change the status of the user of the mobile device 110 can be receive 445 from the user, e.g., through the user interface of the mobile device 110. A determination 450 can be made as to whether the response indicates acceptance or rejection of the offer to change the status. In response to determining 450 the response indicates rejection, processing can end. In response to determining 450 the response indicates acceptance, an electronic record indicating the status of the user of the mobile device 110 can be updated 455 and an electronic message can be sent 460 to the EGM requesting replacement of the content of the electronic game with the substitute content.

As noted above, the status of the user of the mobile device 110 can be based on membership in a loyalty program of a gaming venue in which the EGM is located. In such cases, the prompt providing the offer to change the status can comprise an offer to enroll in the loyalty program and updating the electronic record indicating the status can comprise initiating an process of enrollment of the user of the mobile device in the loyalty program. In other cases, the status of the user of the mobile device can be based on a subscription to a game play service. In such cases, the prompt providing the offer to change the status of the user can comprise an offer to subscribe to the game play service and updating an electronic record indicating the status can comprise initiating a process of subscription of the user in the game play service.

Figure 5:
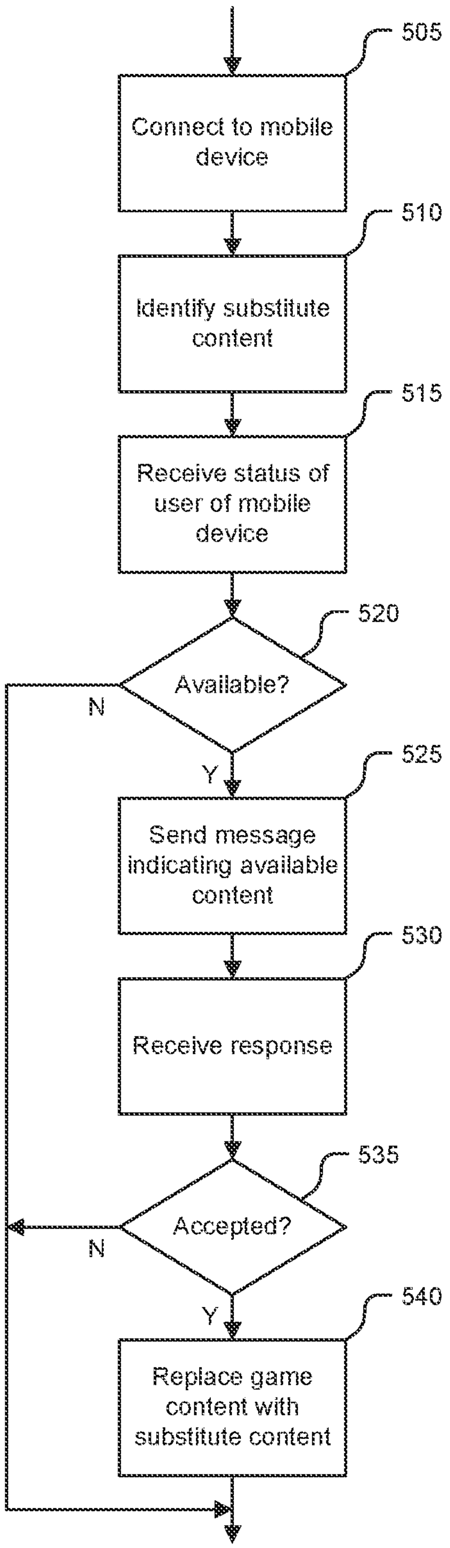
FIG. 5 is a flowchart illustrating an exemplary process for performing game content substitution according to another embodiment of the present disclosure.

FIG. 5 is a flowchart illustrating an exemplary process for performing game content substitution according to another embodiment of the present disclosure. More specifically, this example illustrates a process for performing content substitution as may be performed by an EGM 105 as described above. As illustrated in this example, performing content substitution in an electronic game can begin with connecting 505, e.g., via Bluetooth, WiFi, or other wireless communications, with a mobile device 110 of a player of an electronic game executed by the EGM 105.

Execution of the electronic game can comprise presenting default content of the game. Substitute content can also be identified 510 which can be used in place of the default content of the game. For example, the default content and the substitute content can comprise one or more elements of a user interface of the electronic game. In some cases, the default content and the substitute content can comprise a plurality of elements of a user interface of the electronic game and can define a theme for the electronic game. For example, the substitute content can define a seasonal theme, such as a holiday theme, a theme related to a local sports team, a theme related to a gaming tournament or another event, etc.

User information for the player of the electronic game can be received 515, e.g., from a mobile device of the player, from a repository of player information maintained by a gaming venue system, etc. The user information can indicate a status of the player of the electronic game. For example, the status of the player of the electronic game can be based on membership in a loyalty program of a gaming venue in which the EGM 105 is located. In other cases, the status of the player of the electronic game can be based on a subscription to a game play service.

A determination 520 can be made as to whether the substitute content is available to the player of the electronic game based on the status of the player of the electronic game. In response to determining 520 the substitute content is not available, e.g., the player is not a loyalty program member, subscriber, etc., processing can end. In response to determining 520 the substitute content is available, an electronic message indicating the substitute content can be sent 530 to the mobile device 110.

A response to the message indicating the substitute content can be received 530, e.g., from the mobile device 110 of the player. In some cases, the substitute content can comprise content defined by the player of the electronic game and the response can comprise an indication of the substitute content, e.g., a link to the content or the content itself. A determination 535 can be made as to whether the response indicate acceptance of the substitute content. In response to determining 535 the response does not indicate acceptance, processing can end. In response to determining 535 the electronic message indicating acceptance of the substitute content, the default content of the game can be replaced 540 with the substitute content during execution of the electronic game.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method for substituting content in a user interface of an electronic game executed by an Electronic Gaming Machine (EGM), the method comprising:

connecting with a mobile device of a player of the electronic game executed by the EGM, wherein execution of the electronic game comprises presenting default content of the electronic game, the default content comprising a plurality of elements;

receiving, from the mobile device, user information for the player of the electronic game, the user information indicating a status of the player of the electronic game;

determining, based on the status of the player of the electronic game, whether a substitute element is available to the player of the electronic game;

in response to determining the substitute element is available to the player of the electronic game, identifying the substitute element for an element of the default content of the electronic game; sending, to the mobile device, an electronic message indicating the substitute element;

receiving, from the mobile device, an electronic message indicating acceptance of the substitute element; and in response to the electronic message indicating acceptance of the substitute element, replacing the element of the default content of the electronic game with the substitute element during execution of the electronic game.

2. The method of claim 1, wherein the default content and the substitute element comprise elements of a user interface of the electronic game.

3. The method of claim 1, wherein the plurality of elements of the default content and the substitute element comprise a plurality of elements of a user interface of the electronic game, the plurality of elements of the user interface of the electronic game defining a theme for the electronic game.

4. The method of claim 3, wherein the substitute element defines a seasonal theme.

5. The method of claim 1, wherein the status of the player of the electronic game is based on membership in a loyalty program of a gaming venue in which the EGM is located.

6. The method of claim 1, wherein the status of the player of the electronic game is based on a subscription to a game play service.

7. The method of claim 1, wherein the substitute element comprises content defined by the player of the electronic game and wherein the electronic message indicating acceptance of the substitute element comprises an indication of the substitute element.

8. A method for substituting content in a user interface of an electronic game executed by an Electronic Gaming Machine (EGM), the method comprising:

updating, by a mobile device, an electronic record defining a status of a user of the mobile device;

detecting, by the mobile device, the EGM, the EGM presenting content during execution of the electronic game, wherein the content comprises a plurality of elements;

connecting, by the mobile device with the EGM via a wireless communications channel;

presenting, by the mobile device, an indication that an element of the content presented by the EGM during execution of the electronic game is available to be replaced with a substitute element;

receiving, by the mobile device, a request to replace the element of the content presented by the EGM during execution of the electronic game with the substitute element;

determining, by the mobile device, whether the requested replacement of the element of the content of the electronic game with the substitute element is permissible based on the status of the user of the mobile device;

in response to determining the requested replacement of the element of the content of the electronic game is permissible, sending, from the mobile device to the EGM, an electronic message requesting replacement of the element of the content of the electronic game with the substitute element.

9. The method of claim 8, further comprising, in response to determining the requested replacement of the element of the content of the electronic game is not permissible:

presenting, by the mobile device a prompt providing an offer to change the status of the user of the mobile device;

receiving, by the mobile device, an indication of acceptance of the offer to change the status of the user of the mobile device; and updating, by the mobile device, the status of the user of the mobile device.

10. The method of claim 8, wherein the status of the user of the mobile device is based on membership in a loyalty program of a gaming venue in which the EGM is located, wherein the prompt providing the offer to change the status of the user of the mobile device comprises an offer to enroll in the loyalty program, and wherein updating the status of the user of the mobile device comprises initiating an enrollment of the user of the mobile device in the loyalty program.

11. The method of claim 8, wherein the status of the user of the mobile device is based on a subscription to a game play service, wherein the prompt providing the offer to change the status of the user of the mobile device comprises an offer to subscribe to the game play service, and wherein updating the status of the user of the mobile device comprises initiating the subscription of the user of the mobile device in the game play service.

12. The method of claim 8, further comprising, prior to sending to the EGM the electronic message requesting replacement of the element of the content of the electronic game with the substitute element, receiving, from the EGM, an electronic message comprising an indication of the substitute element, wherein presenting the indication that the element of the content presented by the EGM during execution of the electronic game is available to be replaced with the substitute element comprises presenting the received indication of the substitute element, and wherein the electronic message requesting replacement of the element of the content of the electronic game with the substitute element is sent to the EGM in response to the request to replace the element of the content presented by the EGM during execution of the electronic game with the substitute element.

13. The method of claim 12, wherein the substitute element comprises a plurality of options for content presented by the EGM during execution of the electronic game, wherein the indication of the substitute element comprises an indication of each option of the plurality of options for content presented by the EGM during execution of the electronic game, and the indication of acceptance of the substitute element comprises a selection of one option of the plurality of options for content presented by the EGM during execution of the electronic game.

14. The method of claim 8, wherein the substitute element comprise content provided by the user of the mobile device and wherein the electronic message requesting replacement of the element of the content of the electronic game with the substitute element comprises an indication of the element of the content provided by the user of the mobile device.

* * * * *